US012703612B2

(12) United States Patent
Wyble et al.

(10) Patent No.: US 12,703,612 B2
(45) Date of Patent: Aug. 11, 2026

(54) TRAILER STACKING DEVICE

(71) Applicant: Fritel & Associates, LLC, Waco, TX (US)

(72) Inventors: Dale Wyble, Waco, TX (US); Sean Martin, Waco, TX (US)

( * ) Notice: Subject to any disclaimer, the term of this patent is extended or adjusted under 35 U.S.C. 154(b) by 847 days.

(21) Appl. No.: 17/946,823

(22) Filed: Sep. 16, 2022

(65) Prior Publication Data

US 2023/0090066 A1 Mar. 23, 2023

Related U.S. Application Data

(60) Provisional application No. 63/245,446, filed on Sep. 17, 2021.

(51) Int. Cl.
*B66F 3/00* (2006.01)
*B66F 3/46* (2006.01)
*B66F 9/14* (2006.01)

(52) U.S. Cl.
CPC ................ *B66F 3/46* (2013.01); *B66F 9/148* (2013.01)

(58) Field of Classification Search
CPC .......... B66F 7/00; B66F 7/065; B66F 7/0658; B66F 9/08; B66F 9/00
See application file for complete search history.

(56) References Cited

U.S. PATENT DOCUMENTS 1,351,246 A * 8/1920 Hastings ................. E01B 27/16 104/12
3,490,610 A 1/1970 Czarnecki et al.
4,300,659 A 11/1981 Silverstrand
4,611,962 A 9/1986 Braly et al.
4,826,384 A 5/1989 Okura et al.
6,315,079 B1 11/2001 Berends et al.
6,550,584 B1 4/2003 Granata
6,634,461 B1 10/2003 Baker
6,817,449 B2 11/2004 Berends
6,845,848 B1 1/2005 Kritzer
7,055,802 B1 * 6/2006 Jones ........................ B62B 1/12 254/122
7,500,816 B2 3/2009 Berends et al.
8,251,184 B2 8/2012 De Jong
8,708,107 B2 4/2014 Finkbeiner
9,701,472 B2 7/2017 Glickman et al.
10,569,999 B2 2/2020 Van Houten et al.
10,662,043 B2 5/2020 De Jong
11,027,952 B2 6/2021 Luinge
11,174,139 B2 * 11/2021 Stapensea ................. B66F 9/20
11,661,323 B2 * 5/2023 Rossato ..................... B66F 7/28 254/134
12,173,458 B2 * 12/2024 Zwerenz ................. E04G 11/28
2015/0232308 A1 * 8/2015 Uhl ........................... B66F 7/20 254/89 R
2017/0043951 A1 2/2017 Glickman et al.
(Continued)

FOREIGN PATENT DOCUMENTS

GB 1 183 620 A 6/1987

*Primary Examiner* — Lee D Wilson

(74) *Attorney, Agent, or Firm* — Naman, Howell, Smith & Lee, PLLC; John A. Powell

(57) ABSTRACT

Disclosed are various embodiments for a trailer stacking device that makes use of multiple masts featuring support platforms that are capable of lifting and lowering a trailer vertically during trailer stacking operations.

14 Claims, 13 Drawing Sheets

(56) References Cited

U.S. PATENT DOCUMENTS

| | | | | |
|---|---|---|---|---|
| 2019/0144249 | A1* | 5/2019 | Bartos | B66F 7/065 187/211 |
| 2020/0377354 | A1* | 12/2020 | Smith | B66F 17/00 |
| 2023/0090066 | A1* | 3/2023 | Wyble | B66F 3/46 212/324 |

* cited by examiner

TRAILER STACKING DEVICE

PRIORITY CLAIM

This application claims priority to U.S. Provisional Application No. 63/245,446 filed on Sep. 17, 2021, which is hereby incorporated by reference.

TECHNICAL FIELD OF THE INVENTION

The present invention is generally related to devices that can be used to stack trailers, specifically flatbed trailers that are commonly used for transporting items as part of a tractor-trailer rig.

BACKGROUND OF THE INVENTION

It is often necessary to stack one or more empty flatbed trailers on top of a bottom flatbed trailer that is attached to a tractor for transport of the stacked trailers on top of the tractor-trailer rig to another location. For instance, multiple flatbed trailers may be stacked one on top of another and then all of them may be lashed together prior to the stack of flatbed trailers being transported to another location. Previously it has been necessary to use either overhead lifts, such as gantry cranes, or multiple front-end loader devices operated by multiple workers, such as two or four forklifts, in order to lift one or more flatbed trailers and stack the one or more trailers on top of another flatbed trailer that is part of a tractor-trailer rig used to transport the entire stack to another location. It has also previously been shown that parking a flatbed trailer over a lift device that is situated in an underground pit is another possible solution for elevating an empty flatbed trailer prior to stacking it on top of another flatbed trailer. However, overhead lifts such as gantry cranes are expensive and are not specifically designed for the lifting and stacking of flatbed trailers. Operation of multiple front-end loaders or forklifts for lifting and stacking flatbed trailers is cumbersome and difficult to accomplish without accidents and problems. Using a lifting device located in an underground pit to stack trailers is both expensive with regard to initial construction and requires significant permanent alteration to the location where the device is installed. What is needed is a more efficient and simpler way to lift and stack flatbed trailers on top of each other for subsequent connection and transport as a stack of trailers.

SUMMARY OF THE INVENTION

The present invention is a trailer stacking device that provides a much more efficient and helpful way to lift and stack multiple empty trailers on top of each other than has previously been devised in the prior art. The trailer stacking device has applicability with regard to lifting and stacking multiple trailers for subsequent storage or transport. The trailer stacking device is comprised of four masts that may be used to lift, manipulate in various directions, and then stack flatbed trailers so that the end result is that multiple trailers are stacked in piggyback fashion one on top of the other. In most embodiments, two of the four masts of the trailer stacking device are moveable masts that are moveably positioned on, and configured to move to-and-fro along, sets of tracks that will run generally parallel to the sides of the trailers to be stacked. In such embodiments, the other two masts are stationary masts that will typically be rigidly affixed in place in connection with the ground (it should be noted that the term “ground” as used herein also includes a paved parking lot, car park, road surface, and any similar relatively flat asphalted or paved surface where vehicles can be driven or parked). The trailer stacking device is further comprised of guide rails for tractor-trailer rigs that are rails which are rigidly affixed to the ground a set distance apart, with the guide rails being useful for the positioning of flatbed trailers between the four masts prior to and during trailer stacking operations.

Each of the four masts of the trailer stacking device features a lift frame comprised of two vertical lift beams and a support frame that may be vertically raised to an upper position or lowered to a lower position. The support frame of each of the four masts further features extendable lateral arms with attached trailer supports that can be extended laterally away from the support frame to an extended position wherein the trailer supports are positioned beneath the trailer to be stacked. Once the lateral arms are extended to the extent necessary for the attached trailer supports to be located below the edges of a trailer to be stacked, the trailer can be raised or lowered as the support frames attached to the lateral arms are all four concurrently moved up or down along the vertical length of the lift beams of the four masts. Thus, the concurrent raising and lowering of the support frames of the four masts allows for one or more trailers to be lifted and stacked in succession. Once a first trailer is lifted to an upper position by the upward vertical movement of the support frames of the four masts, a second trailer can be pulled by a tractor into place below the first trailer, and then the support frames holding the first trailer aloft can be lowered until the first trailer comes to rest on top of the second trailer. At this point the first trailer may be lashed to the second trailer and then the stacked trailers may be pulled away for transport by the tractor attached to the second trailer. Alternatively, the trailer stacking process may be repeated again with the elevation of the already-stacked first and second trailers in order to subsequently lower them onto the back of a third trailer for subsequent lashing together and transport of the stacked trailers by a tractor connected to the third trailer.

In addition to the lateral extension or retraction of the lateral arms and their attached trailer supports that will come into direct contact with the trailers during lifting and stacking operations, the support frames of each mast also provide the ability to adjust horizontally to different positions along the length of a trailer to be elevated. Moreover, the horizontal movement of the trailer supports of the four masts can be accomplished either in concert or entirely independent of each other, which allows for much more precise alignment of the trailer supports that serve as the masts’ lifting contact points with the corresponding best “pick up points” along a trailer’s body/rails. This is important because it means that the trailer stacking device can be adapted to lift and stack various types of trailers that have varying configurations. The location of the optimal pickup points along the length of a trailer’s body will vary from trailer to trailer, so being able to horizontally reposition the four support frames and their corresponding trailer supports to desired locations along the length of a trailer to be stacked can be very beneficial. This ability to horizontally shift the masts’ support frames and corresponding trailer supports also means that the trailer supports can be moved to positions where they will not encounter interference from objects affixed to trailers such as toolboxes and cross braces, etc. While horizontal movement of the moveable masts alongside the lengths of a trailer positioned within the guardrails may sometimes be enough to align the support frames and the corresponding trailer supports of the masts with the optimal trailer pick up points, the ability to horizontally move the support frames yields the ability to fine-tune placement of the trailer supports in relation to the length of the trailer body prior to lifting and stacking operations.

Furthermore, the device also features means for automatically accommodating the forward pitching/rolling movement of trailers when they are lowered and their wheels come into contact with another trailer below. For instance, when a first trailer held aloft is lowered by downward movement of the support frames to the point where its wheels come into contact with the top of a second trailer below, there is commonly a forward pitching or jolting movement of the first trailer as its wheels roll slightly forward on the top of the second trailer. This forward lurching motion of the trailers is due to the inherent geometry of the axle support mechanisms. The trailer stacking device is designed to accommodate such abrupt forward pitching/rolling motion of a trailer when it is being set down onto the ground or onto another trailer below during stacking operations.

Additional features of the device are described herein, and an understanding of the operation, function, and components of the embodiments of the device described herein may be facilitated by review of the appended drawings and review of the detailed description below.

BRIEF DESCRIPTION OF THE DRAWINGS

The disclosed invention will be described with reference to the accompanying drawings, which show important sample embodiments, wherein.

DETAILED DESCRIPTION OF THE PREFERRED EMBODIMENTS

Figure 1:
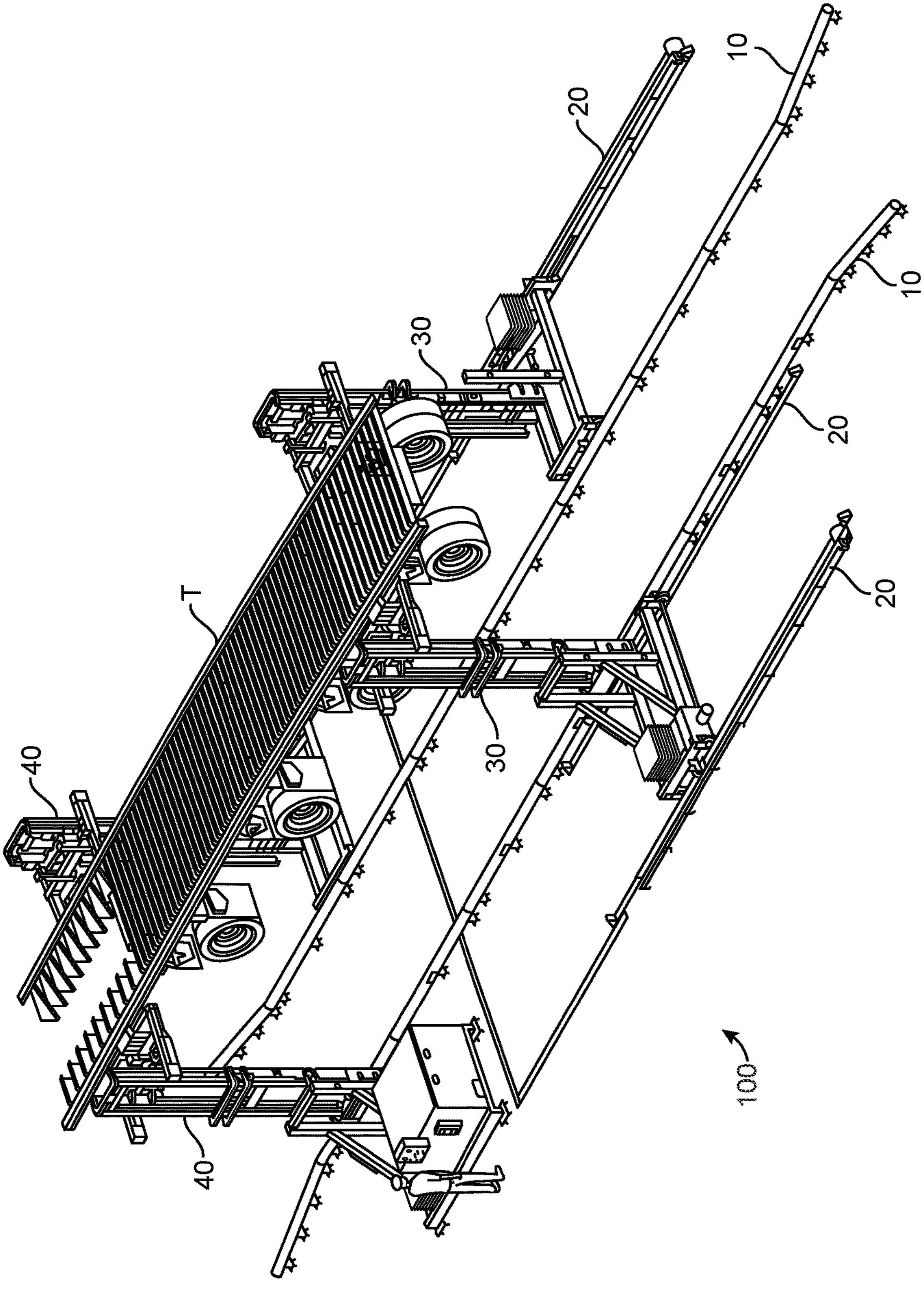
FIG. 1 is a perspective view of an embodiment of the trailer stacking device in its entirety and showing a trailer held aloft in an upward position.

FIG. 1 is a perspective view illustrating certain aspects of a first embodiment of the trailer stacking device 100 hereby disclosed. At the most basic level of generality, the trailer stacking device is comprised of guide rails 10 for positioning trailers T to be stacked, two sets of mast tracks 20, two moveable masts 30, and two stationary masts 40. The guide rails 10 are rigidly affixed to the ground. The two moveable masts 30 are repositionably mounted on top of mast tracks 20, with each of the moveable masts 30 and its respective set of mast tracks 20 positioned on either side of the guide rails 10. As illustrated in FIG. 1, the trailer stacking device 100 is also comprised of two stationary masts 40, with each of the stationary masts 40 being rigidly affixed to the ground and positioned on either side of the guide rails 10, but with the stationary masts 40 being located some distance away from the moveable masts 30 and their respective mast tracks 20. As shown in FIG. 1, a trailer T, which is just the workpiece of the invention, can be moved to a position where the trailer T is within the area defined by the guide rails 10 and then the trailer T may be lifted up off the ground by the moveable masts 30 in cooperation with the stationary masts 40. All of the masts 30, 40 feature certain elements that will be discussed below which make lifting of one or more trailers vertically upward possible so that multiple trailers may be stacked one on top of the other for subsequent storage or transport.

Figure 2:
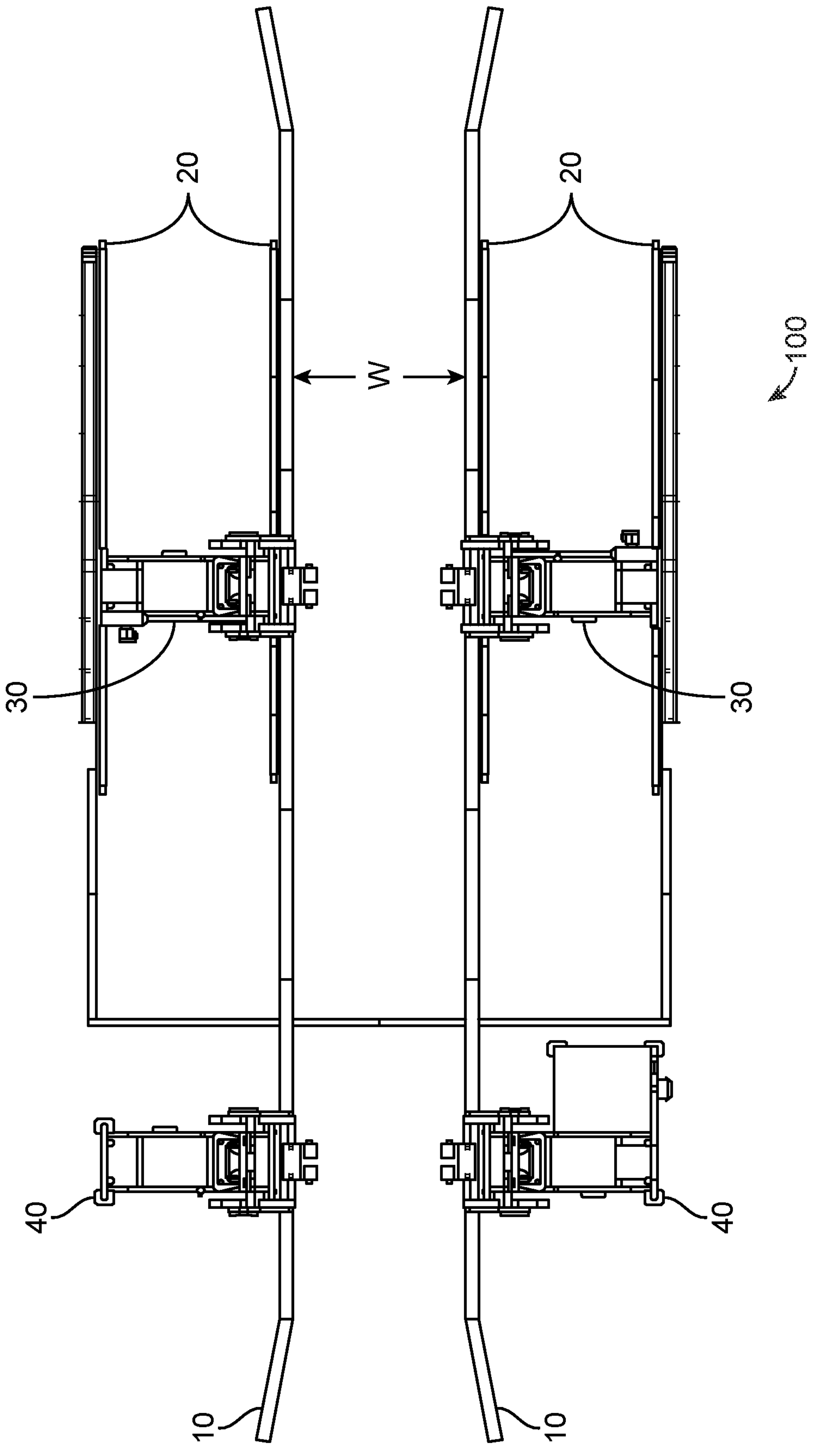
FIG. 2 is a top view of an embodiment of the trailer stacking device.

FIG. 2 is a top view of an embodiment of the trailer stacking device 100 that is hereby disclosed. FIG. 2 shows many of the same features of the device 100 as were shown in FIG. 1, but some of the features may be better understood when reviewing both FIGS. 1 and 2 together. As again shown in FIG. 2, the trailer stacking device 100 includes two moveable masts 30 that are positioned on top of sets of mast tracks 20 that are positioned on either side of the guide rails 10. The trailer stacking device 100 also includes two stationary masts 40, wherein each stationary mast 40 is located on an opposite side of the guide rails 10. The stationary masts 40 are horizontally displaced some distance from the location of the mast tracks 20 and their respective moveable masts 30. As stated previously, the moveable masts 30 are configured to be able to move horizontally to-and-fro to various positions along the lengths of the mast tracks 20. The primary purpose of the capability to reposition the moveable masts 30 along the lengths of the mast tracks 20 is to be able to accommodate trailers T of varying lengths. Obviously, the lengths of trailers stacked one day may not be the same as the lengths of trailers stacked on another day, so the ability to move the moveable masts horizontally so that they can accommodate trailers of different lengths is important.

In the illustrated embodiment of FIG. 2, the above-mentioned horizontal movement of the moveable masts 30 in order to reposition them at desired locations along the length of the mast tracks 20 is accomplished by rolling motion of wheels provided at the base of the moveable masts 30 that come into contact with the tops of the rails of the mast tracks 20. As also illustrated in FIG. 2, the guide rails 10 that serve to guide tractor-trailer rigs pulling trailers into position within the trailer stacking device 100 may be repositioned apart at various widths W, but in most embodiments the guide rails 10 will be located at a selected standard width W apart from each other and then they will be rigidly affixed to the ground in a permanent manner. Although it is possible to practice the disclosed invention without inclusion of the guide rails 10, the guide rails 10 are part of the preferred embodiment.

Figure 3:
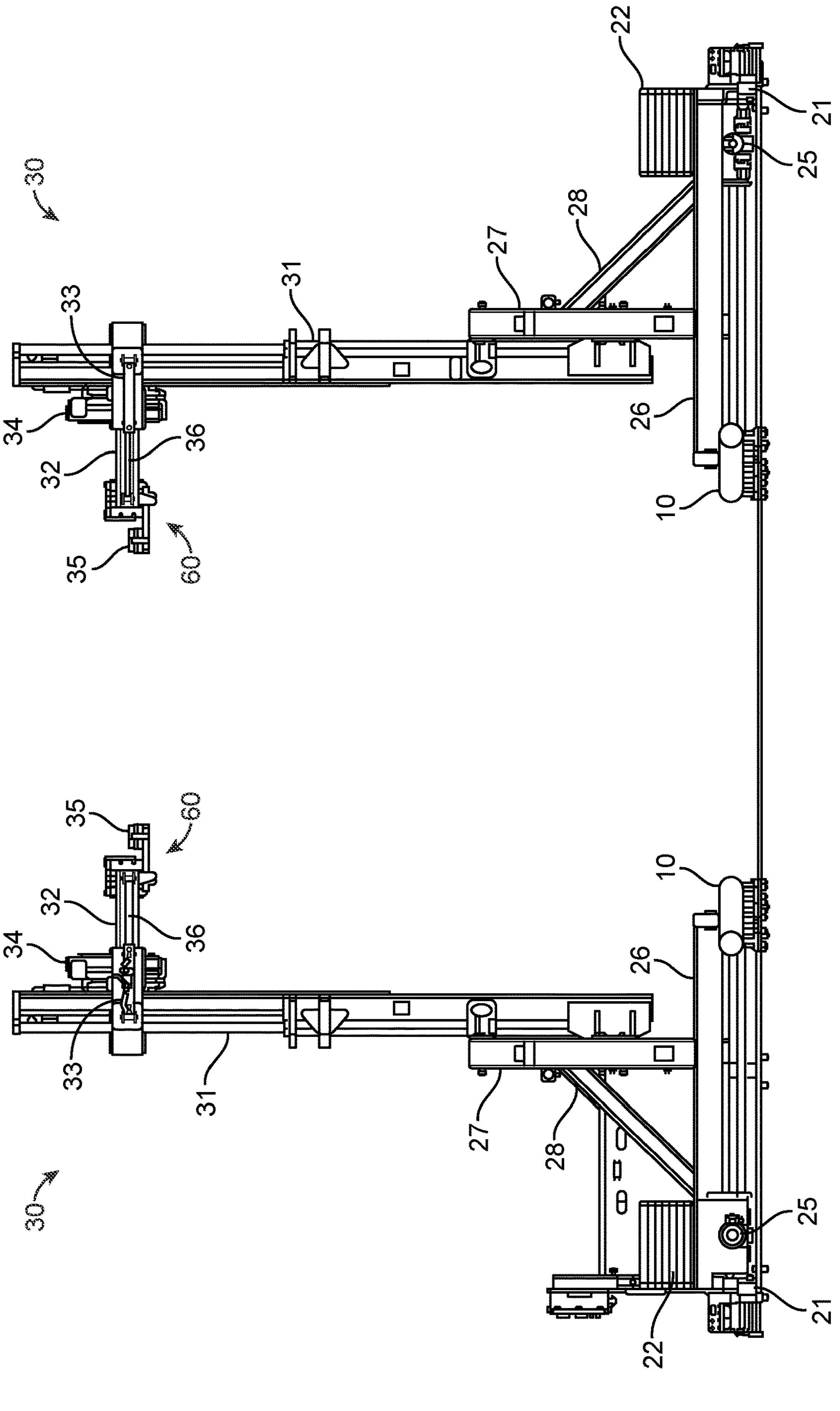
FIG. 3 is a back view of an embodiment of the trailer stacking device showing only the moveable masts of the device and the guide rails, with the stationary masts not shown.

FIG. 3 presents a front view of the moveable masts 30 and the guide rails 10 of an embodiment of the trailer stacking device 100. As discussed previously, the moveable masts 30 will be located on opposite sides of the guide rails 10 to the extent that an embodiment includes the guide rails 10. Each moveable mast 30 features a rigid, sturdy base frame 26 with multiple track wheels 21 that are rollingly mounted on top of mast tracks 20 (not shown in FIG. 2) and allow the moveable masts 30 to be horizontally repositioned at desired locations along the lengths of the mast tracks 20. Each of the moveable masts 30 also features a mast position actuator 25 which may be a motor driven system for moving the moveable masts 30 to-and-fro along the mast tracks 20 to a desired position where they will be used in stacking operations. The moveable masts 30 further feature counterweights 22 to offset the weight of one or more trailers during stacking operations, and each also features a pair of vertical base arms 27 and attached base support arms 28. The vertical base arms 27 are rigidly attached to the base frame 26 and extend vertically upward therefrom. A vertical lift beam 31 is rigidly attached to each of the vertical base arms 27 and the vertical lift beams 31 extend vertically upward therefrom. The pair of vertical lift beams 31 cooperate to provide a frame for the vertical raising or lowering of a support frame 60. As discussed below, the support frame 60 of each mast may be selectively raised vertically or lowered vertically to desired positions along the vertical length of the vertical lift beams 31 in order to move one or more trailers up or down during trailer stacking operations.

As further shown by FIG. 3, each of the support frames 60 is comprised of a lateral arm housing 33 within which two lateral arms 32 are slidingly disposed. The lateral arms 32 are connected to one, and preferably a pair of, trailer supports 35 that serve as the contact points that will come into contact with the bottom of a trailer's edges or the trailer's undercarriage during trailer stacking operations. The lateral arms 32 may be extended or retracted laterally by means of lateral actuators 36, which in the first embodiment are hydraulic cylinders. The pair of lateral actuators 36 allow for the lateral arms 32, and therefore the attached trailer supports 35, to be moved laterally so that they may be extended laterally to position the supports 35 of each mast under a respective side of a trailer prior to and during the lifting of the trailer, and may be retracted laterally after the trailer has been stacked on top of another trailer below. In other words, the lateral actuators 36 may be used to extend or retract lateral arms 32 and their attached supports 35 in a movement that would be generally perpendicular to the sides of a trailer that is positioned in the area defined by the guide rails 10 below that is involved in trailer stacking operations.

Figure 4:
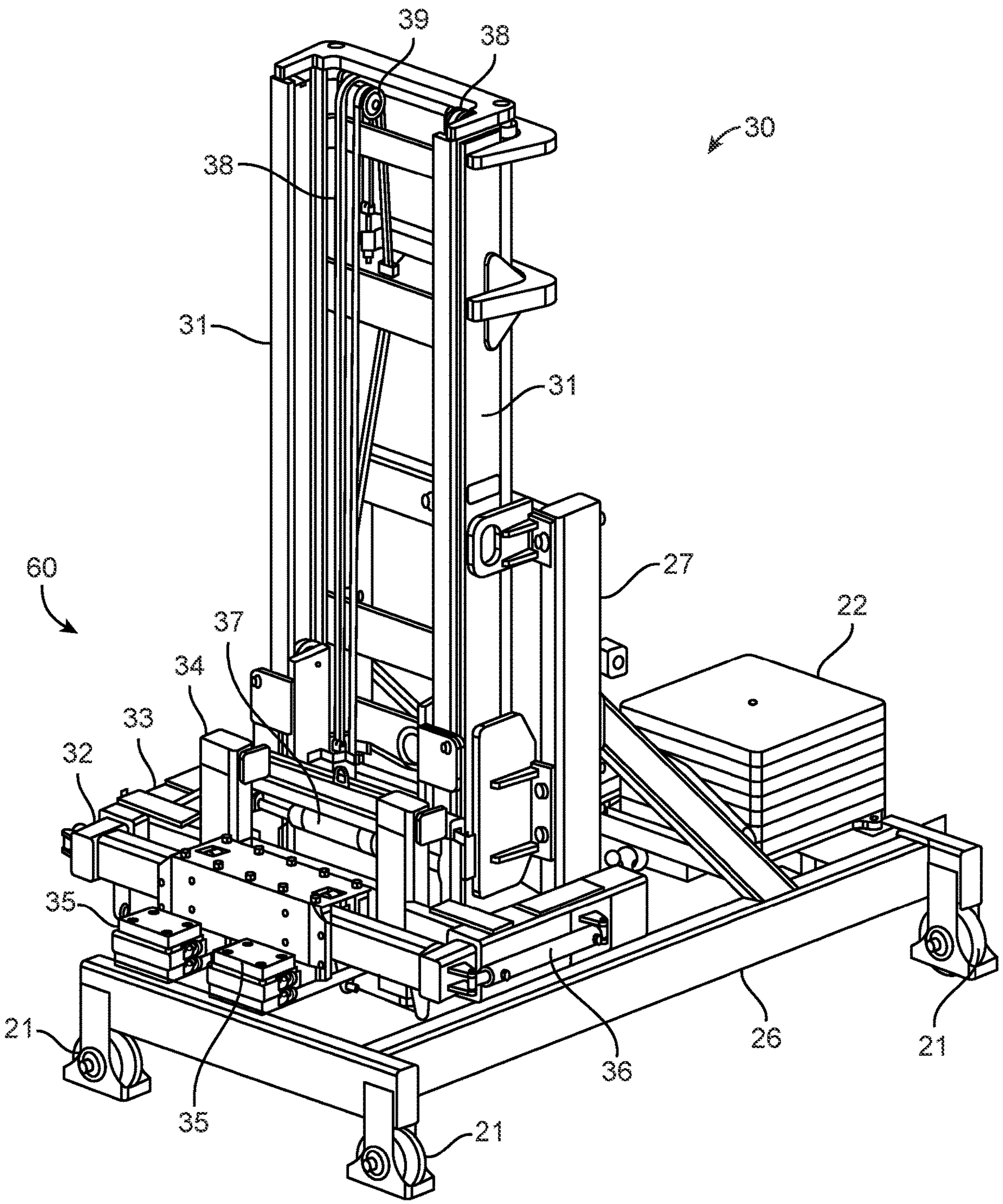
FIG. 4 is a perspective view of one of the moveable masts of an embodiment of the trailer stacking device.

FIG. 4 is a perspective view of one of the movable masts 30 that illustrates some additional features. As shown in FIG. 4, each moveable mast 30 further features a horizontal actuator 37 that may be used to horizontally move the support frame 60 and its attached trailer supports 35. This horizontal actuator 37 is illustrated in FIG. 4 as a hydraulic cylinder. The horizontal actuator 37 allows for the support frame 60 and its respective trailer supports 35 to be moved horizontally in order to side-shift the support frame 60 in directions that would be parallel to the length of a trailer that is positioned in the area defined by the guide rails 10 below. As discussed previously, this ability to move the support frame 60 horizontally in a side-shift movement that moves that support frame 60 to a desired location along the length of a trailer to be lifted is an important feature because it allows for the support frame 60 and its trailer supports 35 to be more exactly aligned with the optimal pick-up points along the length of a trailer's body and also to avoid interference of common trailer accessories and components such as toolboxes and cross members. FIG. 4 also provides a view of the vertical lift track 38 and the vertical actuator 39 that are configured to vertically raise the lift platform 60 or lower the lift platform 60 along the length of the vertical lift beams 31 during trailer stacking operations. The lift track 38 may be comprised of one or more rigid vertical guides or tracks, while the vertical actuator 39 may be a motor driven cable and pulley type system.

Figure 5:
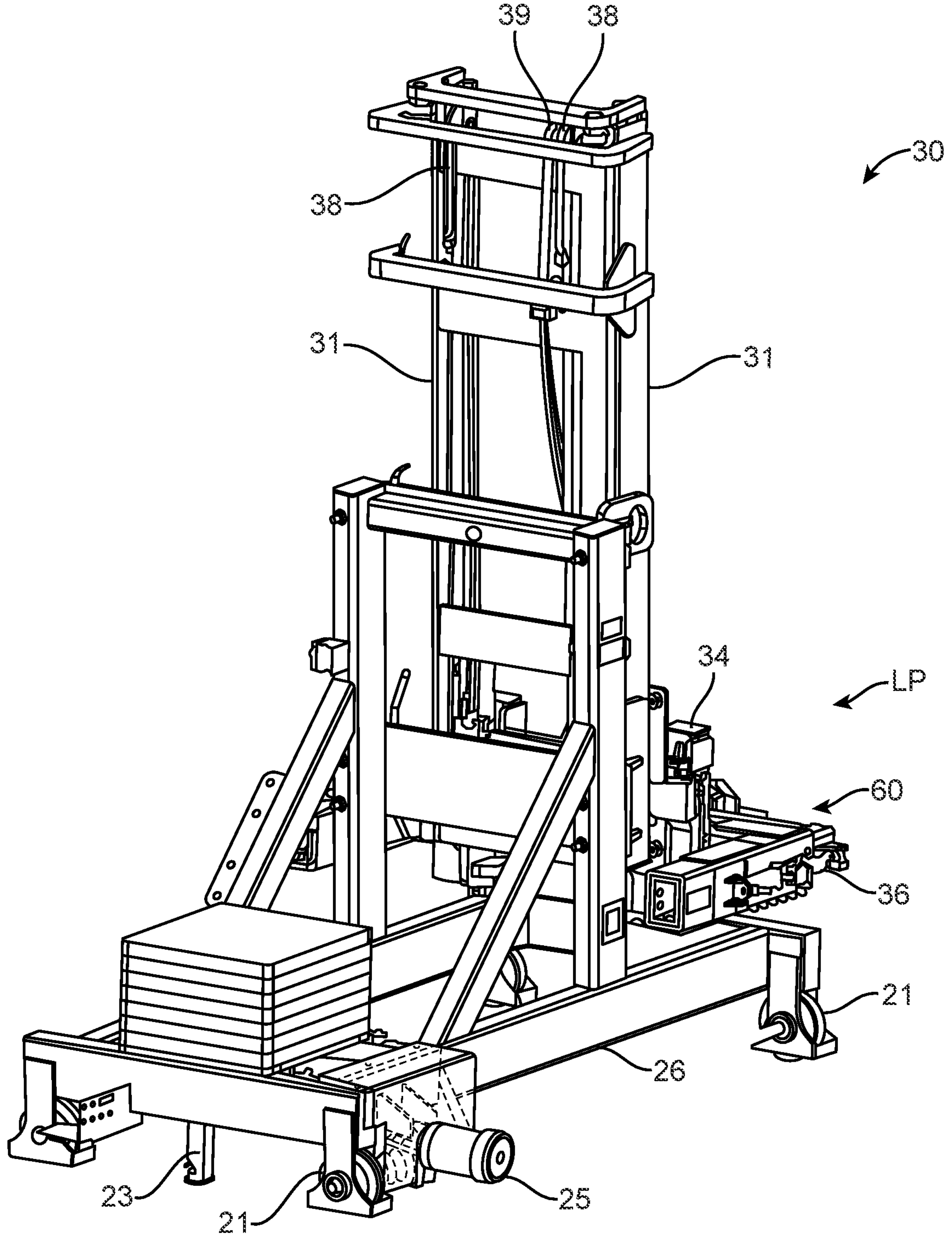
FIG. 5 is another perspective view of one of the moveable masts of an embodiment of the trailer stacking device.
Figure 6:
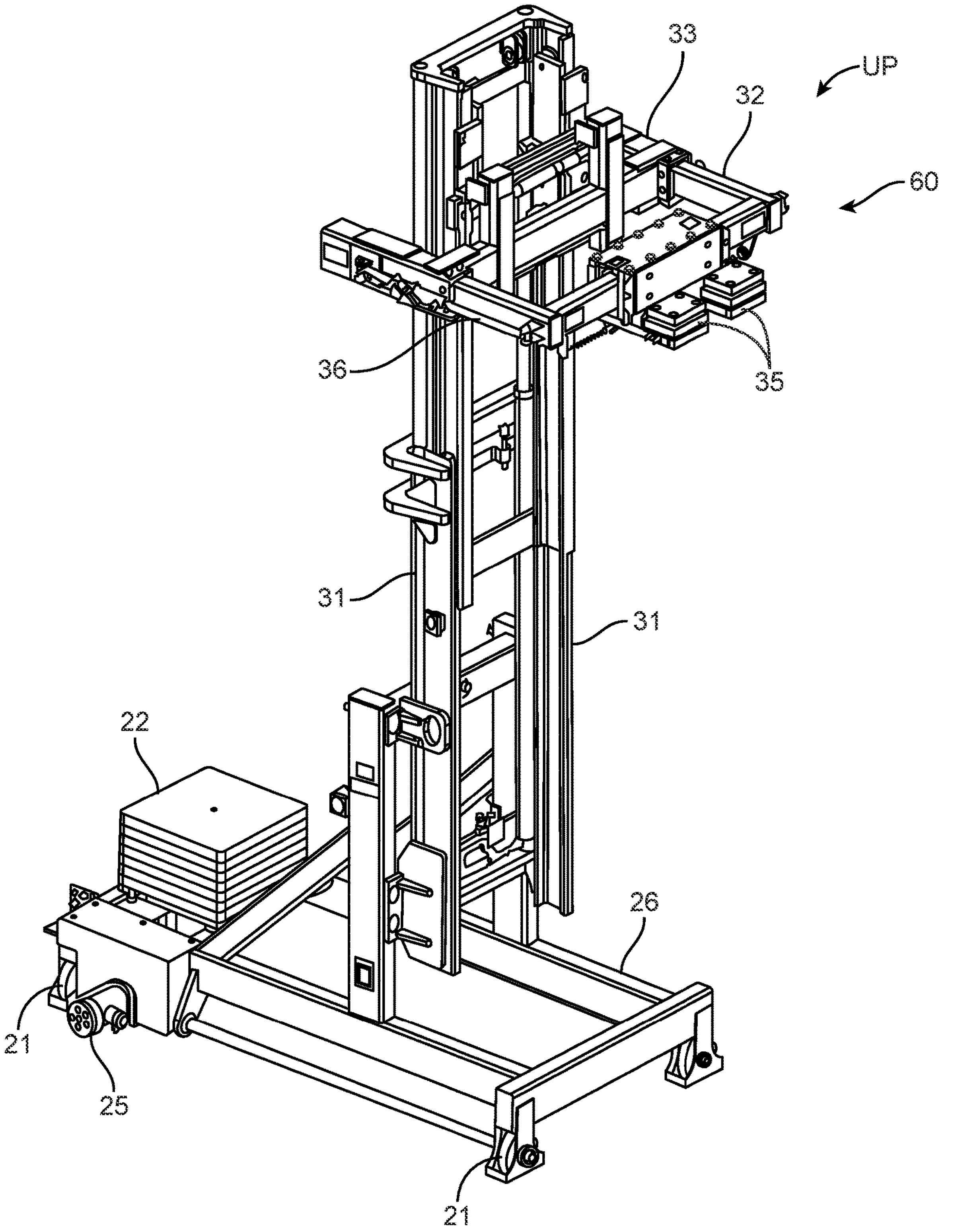
FIG. 6 is yet another perspective view of one of the moveable masts of an embodiment of the trailer stacking device.

FIGS. 5 and 6 are additional views of the moveable masts 30 of an embodiment of the device. As shown in FIG. 5, the vertical lift track 38 and the vertical actuator 39 may be used to lower the support frame 60 to a lower position LP in relation to the vertical lift beams 31. Likewise, as shown in FIG. 6, these same elements may be used to raise the support frame 60 to an upper position UP. In practice, the support frame 60 may be selectively raised or lowered to any vertical position along the length of the vertical lift beams 31 in order that trailer lifting and lowering can be accomplished during trailer stacking operations.

Figure 7:
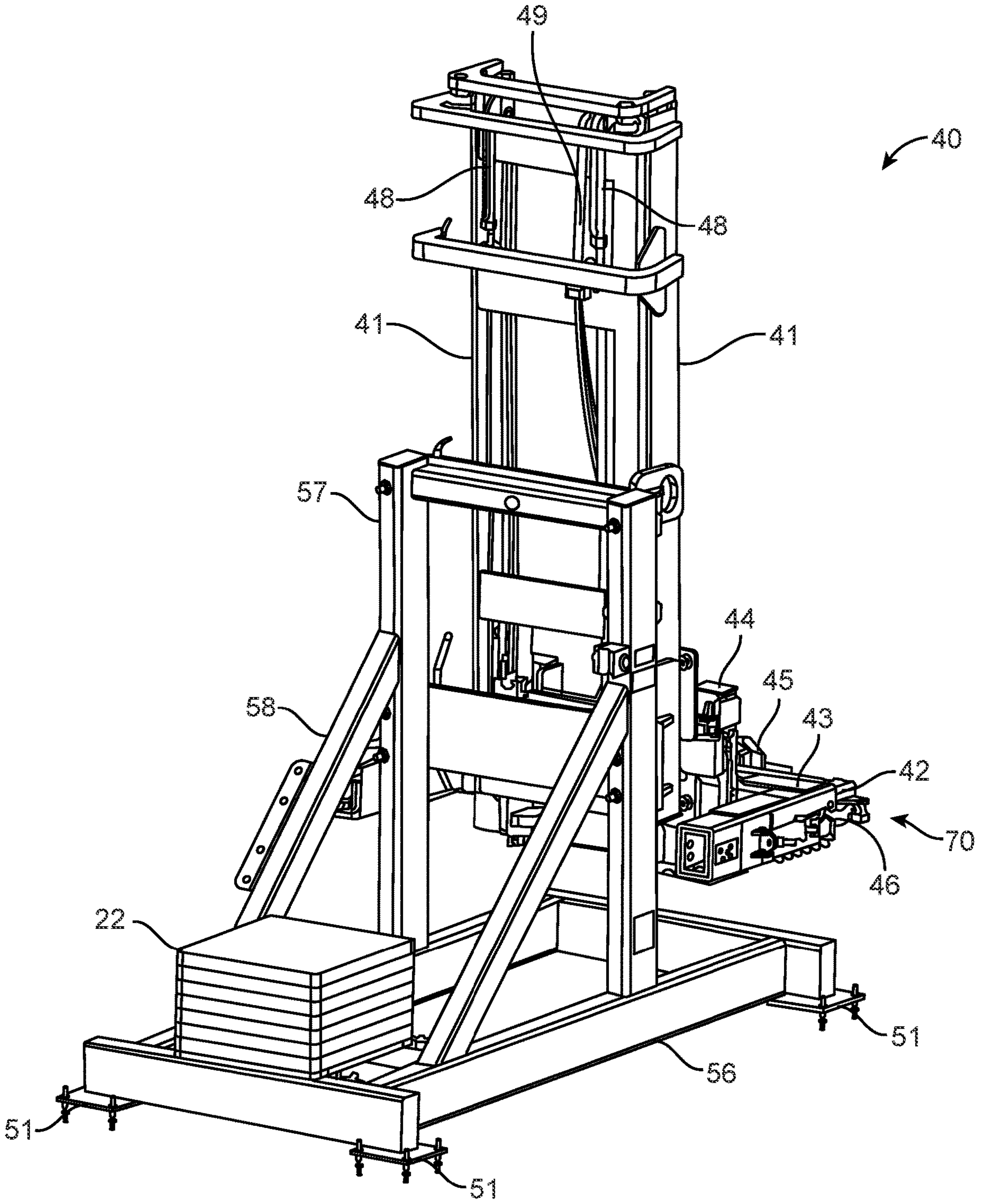
FIG. 7 is a perspective view of one of the stationary masts of an embodiment of the trailer stacking device.
Figure 8:
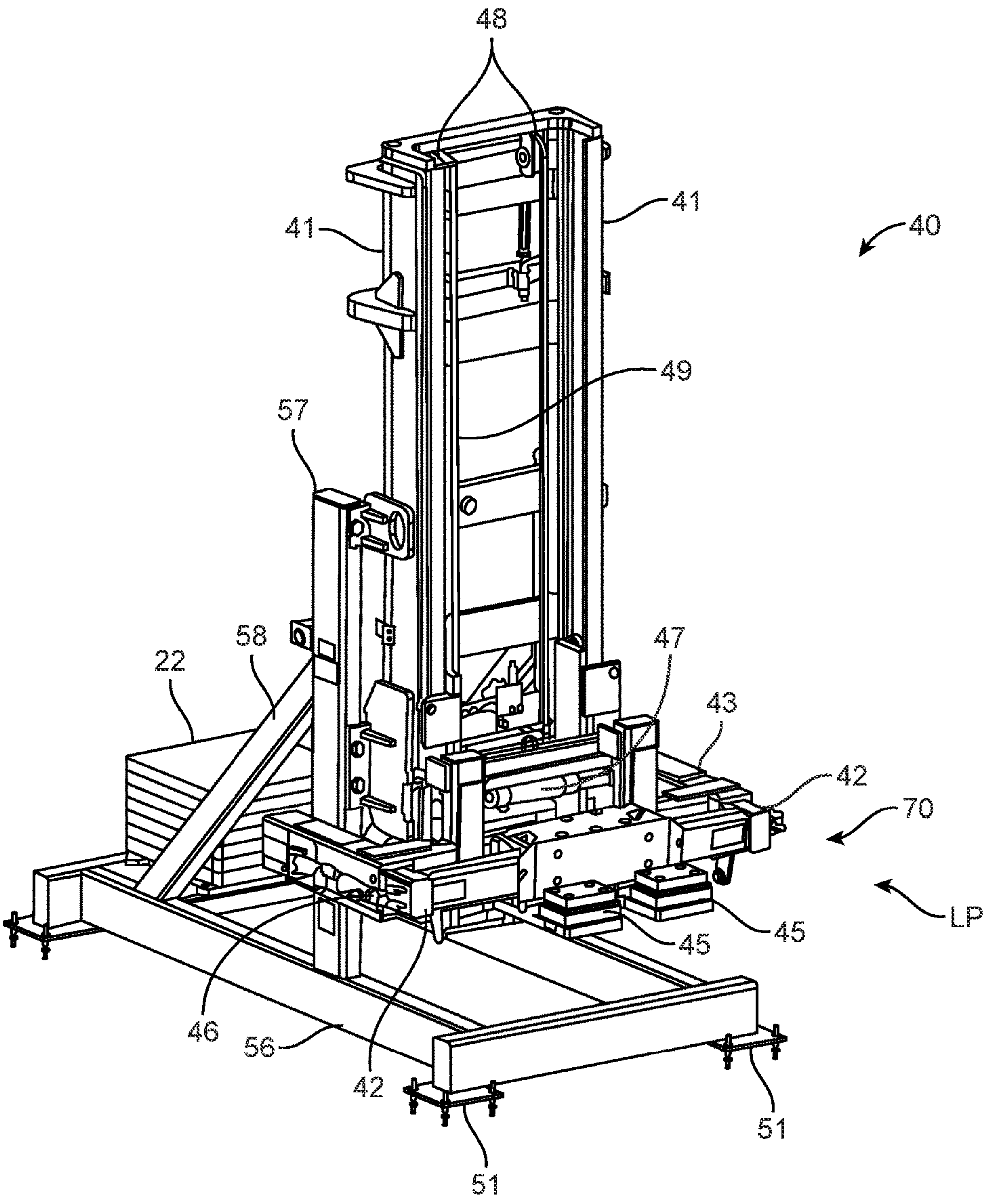
FIG. 8 is another perspective view of one of the stationary masts of an embodiment of the trailer stacking device.
Figure 9:
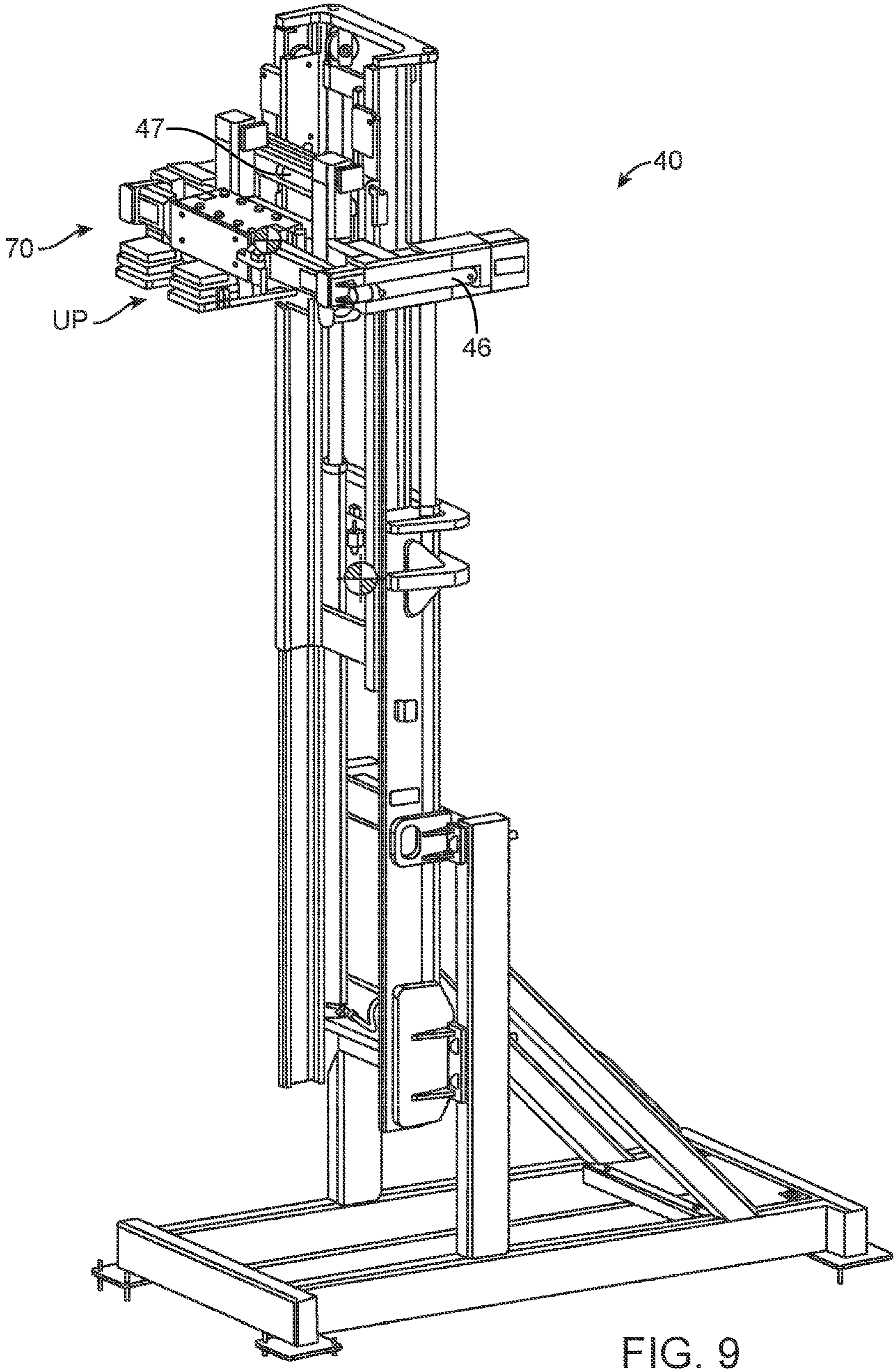
FIG. 9 is yet another perspective view of one of the stationary masts of an embodiment of the trailer stacking device.

FIGS. 7-9 illustrate the stationary masts 40 of an embodiment of the trailer stacking device 100. It will be appreciated that the stationary masts 40 are very similar in structure and in composition to the moveable masts 30 that were previously described. The stationary masts 40 each feature a base frame 56, a pair of vertical arms 57, and support arms 58. Vertical lift beams 41 are rigidly attached to the vertical arms 57 and extend vertically upward therefrom. A support frame 70 comprised of a lateral arm housing 43 and two lateral arms 42 slidingly disposed therein is repositionably connected to the vertical lift beams 41. The support frame 70 further features one or more trailer supports 45 (typically a pair of such supports will be used) that will come into contact with the underside of the edges of the trailers or the under carriage during lifting and stacking operations. A pair of lateral actuators 46 may be used to laterally extend or retract the lateral arms 42 and therefore the connected trailer support(s) 45 in a manner that is essentially perpendicular to the edge of a trailer positioned within the area defined by the guide rails 10 below. The support frame 70 and the trailer supports 45 may also be horizontally moved in a side-shift manner that is more or less parallel to the edges of the trailer that is to be lifted by means of a horizontal actuator 47 so that the support frame 70 and its trailer supports 45 will be moved to the best place along the length of the trailer for picking the trailer up. The entire support frame 70 may be raised or lowered in a vertical manner along the length of the lift beams 41 by means of a vertical lift track 48 and a vertical actuator 49.

A primary difference between the moveable masts 30 and the stationary masts 40 is that the moveable masts 30 include repositioning means such as multiple track wheels 21 that allow the moveable masts 30 to be moved horizontally back and forth to selected locations along the mast tracks 20, while the stationary masts 40 are rigidly kept in a set location by rigid affixation means, such as bolting in place. The stationary masts 40 will typically be bolted into the ground by means of one or more screw plates 51 that are rigidly attached to the base frame 56 and permanently affixed to the ground at set locations using bolts. It should also be noted that the moveable masts 30, while horizontally repositionable along the lengths of the mast tracks 20 by means of the track wheels 21, may nevertheless be temporarily held in place for lifting and stacking operations using a downwardly deployable mast stand 23 as illustrated in FIG. 5.

FIGS. 8 and 9 also illustrate the vertical movement of the support frame 70 of each of the stationary masts 40. As shown in FIG. 8, the support frame 70 for each stationary mast 40 may me moved vertically downward to a lower position LP in relation to the vertical lift beams 41. As shown in FIG. 9, the support frame 70 may also be raised to an upper position UP. As with the support frames 60 of the moveable masts 30, the support frames 70 of the stationary masts 40 may be vertically moved to a selected location in relation to the vertical lift beams 41 and temporarily held in place. The coordinated vertical movements of the support frames 60, 70 of all the masts 30, 40 to either a desired upper position UP or to a desired lower position LP along the vertical beams 31, 41 is obviously the manner in which trailers are selectively lifted or lowered during trailer stacking operations.

Figure 10:
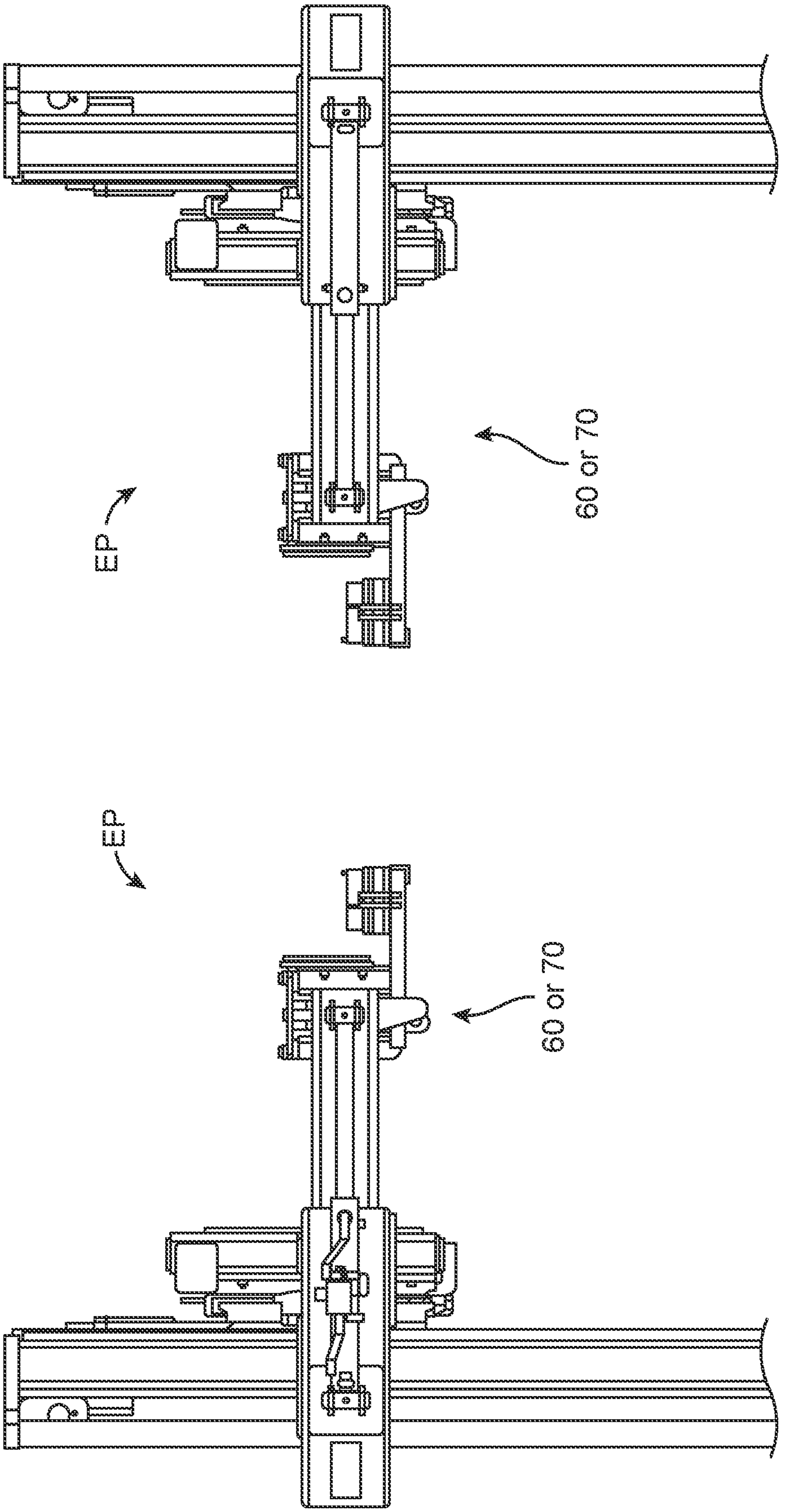
FIG. 10 is a side view of a portion of two of the masts of an embodiment of the trailer stacking device illustrating a particular positioning of the support frames of the masts.
Figure 11:
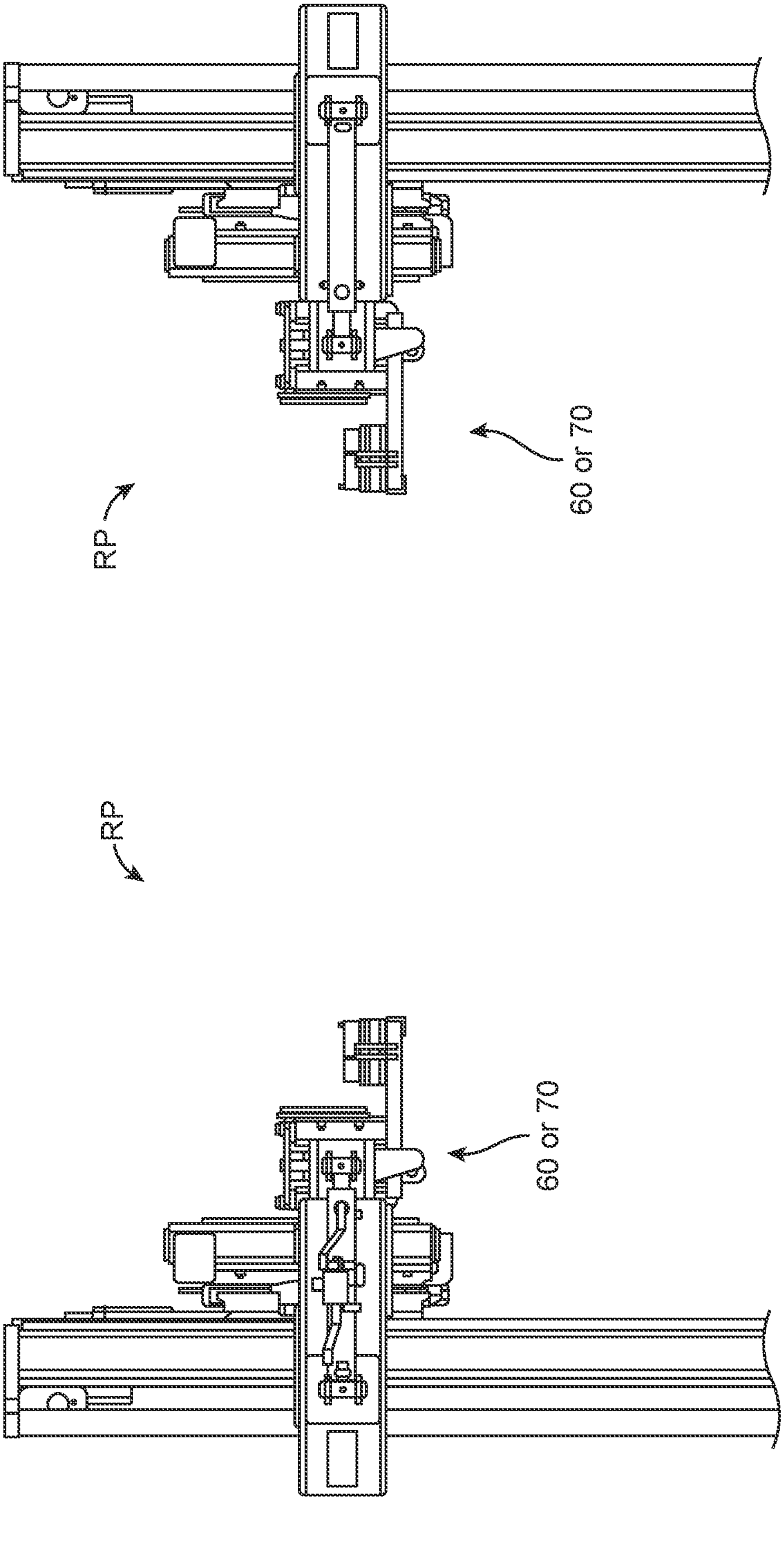
FIG. 11 is a side view of a portion of two of the masts of an embodiment of the trailer stacking device illustrating a different positioning of the support frames of the masts.

FIGS. 10 and 11 illustrate the potential lateral extension and lateral retraction that is possible with each of the support frames 60, 70. As illustrated, the lateral arms 32, 42 and trailer supports 35, 45 of each of the support frames 60, 70 may be either laterally moved towards trailers into an extended position EP or retracted away from trailers into a retracted position RP. As previously stated, this lateral extension or retraction is made possible by the lateral actuators 36, 46. This lateral movement of the laterals arms 32, 42 and corresponding trailer supports 35, 45 makes it possible to position the trailer supports 35, 45 as needed in relation to the underside of the edges of a trailer or a trailer's undercarriage. As can be appreciated from reviewing all of the drawings together, the lateral extension and lateral retraction of the lateral arms 32, 42 involve movement of the lateral arms 32, 42 perpendicularly to the lengthwise edge of a trailer that is in position within the device and waiting to be lifted during stacking operations. Prior to lifting a trailer, the support frames 60, 70 are lowered to positions underneath the edges of the trailer using the vertical actuators 39, 49, then the lateral arms 32, 42 are extended to an extended position EP so that the trailer supports 35, 45 are positioned under the edges or undercarriage of a trailer, and then the support frames 60, 70 are moved vertically upward in order to lift the trailer that is now resting atop the trailer supports 35, 45. As can be understood, this process is reversed in order to set the trailer down on the ground or on top of another trailer, and the lateral arms 32, 42 can then be retracted away from the trailer's edges after the trailer has been set down.

Figure 12:
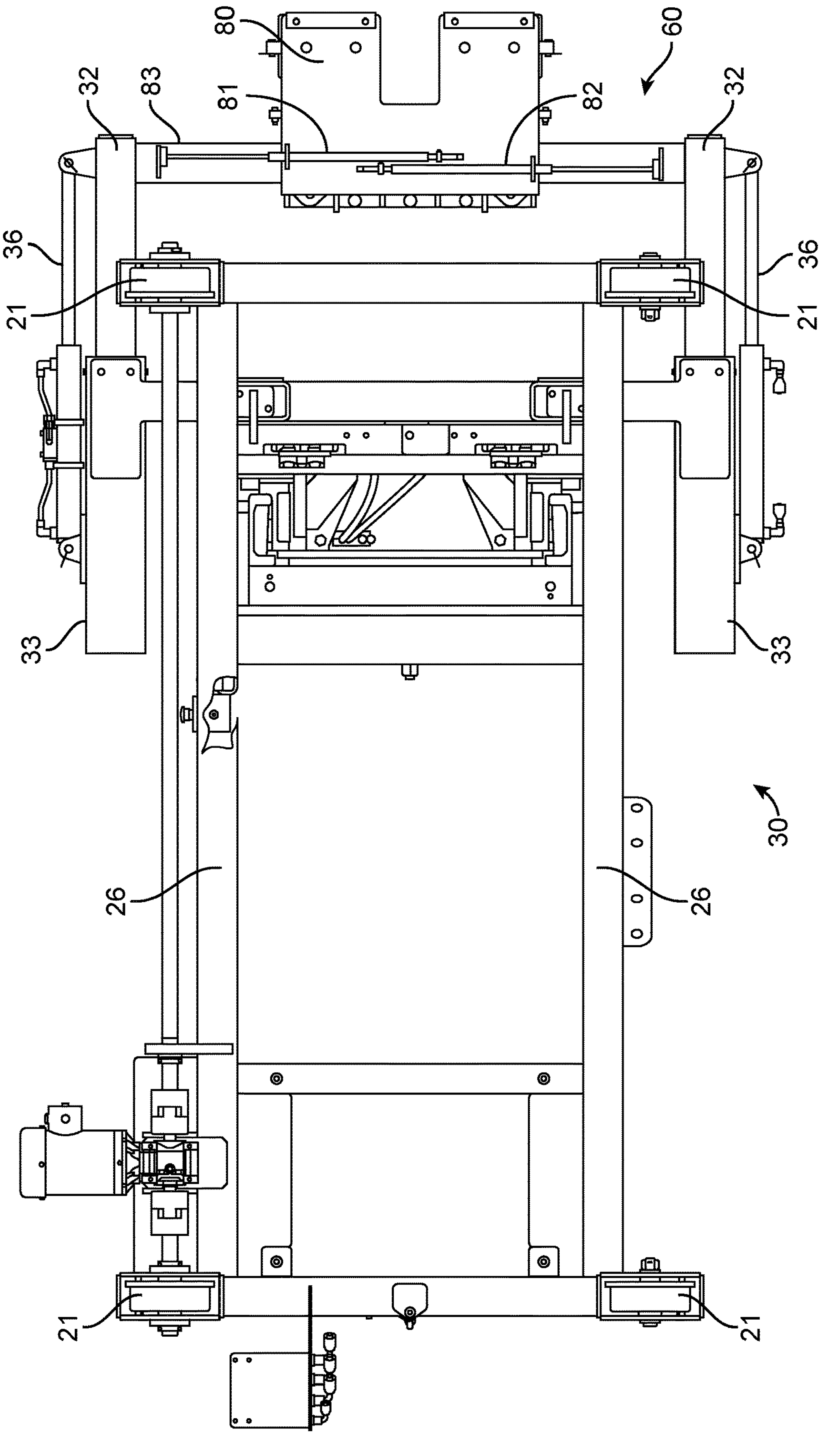
FIG. 12 is a bottom view of one of the moveable masts of an embodiment of the trailer stacking device.

FIG. 12 provides a bottom view of one of the moveable masts 30. FIG. 12 illustrates many of the same features already discussed, but also provides additional detail regarding another helpful feature of the device 100. Although not visible in FIG. 12, it should be appreciated that in many embodiments the trailer supports 35 would be attached to the top side of a trailer support plate 80. The trailer support plate 80 in such embodiments is located intermediate of the lateral aims 32 and is horizontally moveably connected to a trailer support arm 83 that is itself connected on each of its ends to the lateral arms 32. The moveable connection of the trailer support plate 80 to the trailer support arm 83 is provided, in part, by means of air cylinders 81, 82 that have piston rods. The air cylinders 81, 82 interconnect the trailer support plate 80 to the trailer support arm 83 in such a manner that if sudden horizontal force is applied to the trailer supports 35 in a direction that is more or less parallel with the length of a trailer that is in contact with the supports 35, the supports 35 and their support plate 80 can automatically move or "float" in a horizontal direction with the trailer to accommodate that sudden application of force. This provides additional utility when using the device to stack trailers because it has been observed that when a trailer is lowered down onto the back of a second trailer below or onto the ground, the trailer typically lurches forward in an abrupt forward motion when its wheels roll forward a slight amount as they come into contact with the back of the second trailer or the ground. The air cylinders 81, 82 connecting the trailer support plate 80 to the trailer support arm 83 allows for the immediate horizontal displacement of the support plate 80 and its attached trailer supports 35 in a floating motion so that the forward movement of a trailer when being set down on top of another trailer or onto the ground below is accommodated and does not damage the support frame 60 or any of its other components. Thus, the air cylinders provide the ability of contacting points of the device, namely the trailer supports 35, 45, to float forward with the trailer if it lurches forward when being set down on the ground or atop another trailer.

Figure 13:
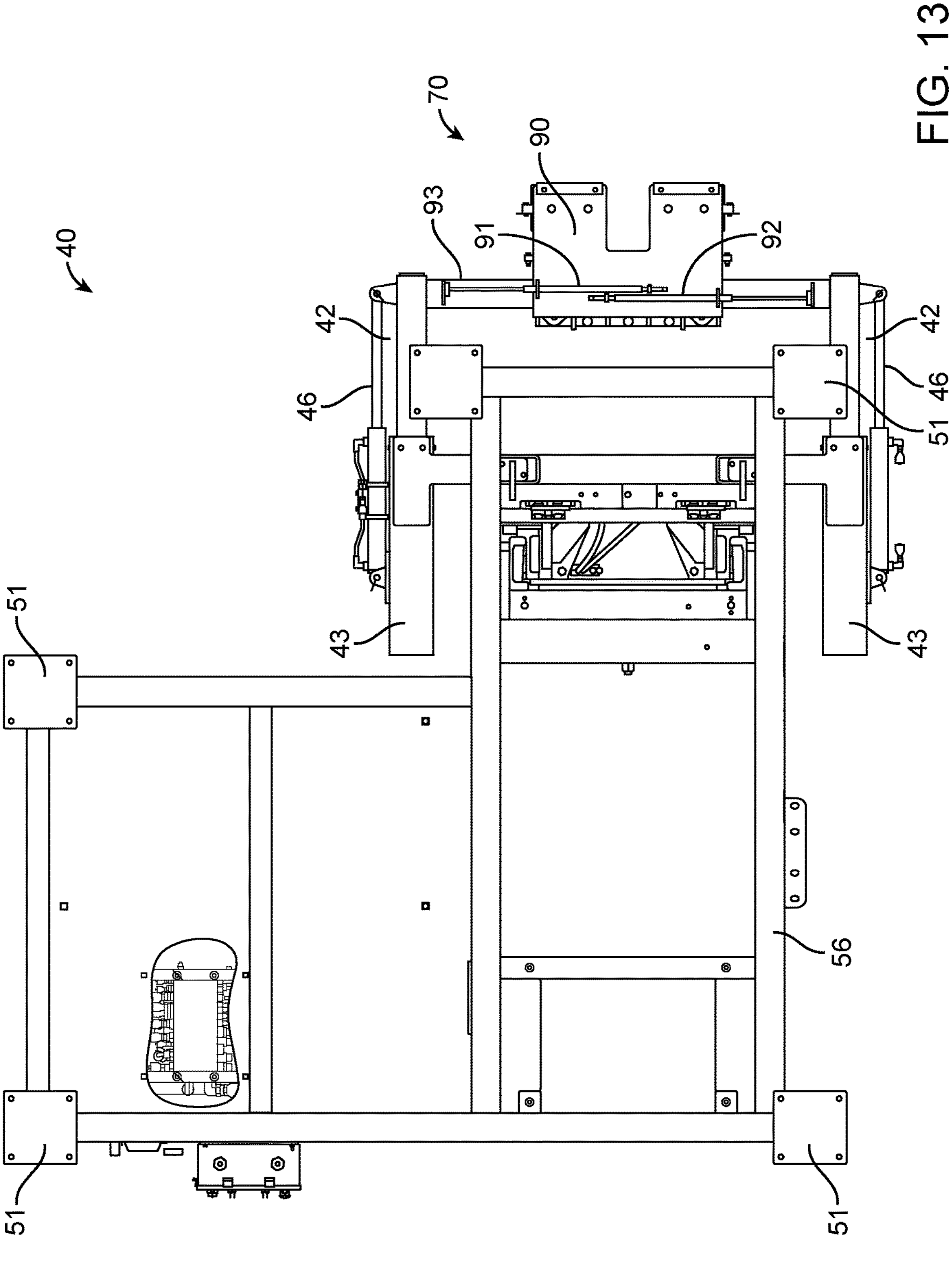
FIG. 13 is a bottom view of one of the stationary masts of an embodiment of the trailer stacking device.

FIG. 13 simply illustrates similar features with regard to the stationary masts 40. FIG. 13 is a bottom view of one of the stationary masts 40 of an embodiment of the device 100. FIG. 13 shows a trailer support plate 90 to which one or more trailer supports 45 are attached (not shown in FIG. 13). The trailer support plate 90 is positioned intermediate of the lateral arms 42 to which it is interconnected by means of a trailer support arm 93 and two air cylinders 91, 92 having piston rods. As with the moveable masts 30, the presence of the air cylinders 91, 92 allow for the trailer support plate 90 and the trailer supports 45 of the stationary masts 40 to automatically and immediately displace horizontally and "float" forward when a trailer in contact with the trailer supports 45 is lowered and abruptly rolls forward as its wheels come into contact with either another trailer or the ground below. This automatic displacement in response to a sudden forward force being applied to the trailer supports 35, 45 by the trailer as it lurches forward prevents damage to the components of the device and/or the trailer.

It should also be noted that many of the features and components of the trailer stacking device 100 illustrated in the supporting drawings could take different forms without departing from the scope of the invention disclosed herein. For instance, the movement of the moveable masts 30 along the mast tracks 20 has been illustrated as being accomplished by multiple wheels that would be connected by an axle to a motor or engine wherein the wheels are in rolling contact with two rails that are provided by each of the mast tracks 20. However, while a preferred embodiment involves use of motor-driven, track mounted wheels, the movement of the masts 30 could also be accomplished by a track arrangement such as a continuous track system or caterpillar track system attached to the bottom of the masts 30, a hydraulic or pneumatic piston style device for pushing or pulling the masts 30, a belt and pulley type system, or many other alternatives. In fact, a prototype of the device has recently been constructed using a combination of track-mounted wheels and a motor-driven caterpillar type drive that actuates movement of the moveable masts to desired positions along the length of the mast tracks.

Furthermore, the horizontal actuators 37, 47 and the lateral actuators 36, 46 have been illustrated as hydraulic piston style actuators, while the vertical actuators 39, 49 have been described as potentially being a cord/belt and pulley type system, but it is not required that such actuators 36, 46, 37, 47, 39, 49 be hydraulic actuators or pulley systems. In reality, all of those actuators 36, 46, 37, 47, 39, 49 could be hydraulic actuators, linear actuators, electric rod actuators, pneumatic pistons, motors, motors with a gear box and chain, or many other alternatives. For example, in a prototype of the device recently constructed, the vertical raising and vertical lowering of the support frames 60, 70 of the masts 30, 40 has been accomplished using a single primary hydraulic cylinder that accomplishes the vertical actuation rather than a belt and pulley type vertical actuator, so those types of structures would be interchangeable for purposes of the inventive concept. The essence of all of the actuators 36, 46, 37, 47, 39, 49 is that they are components or systems that are able to effect the vertical, lateral, and horizontal movements necessary to raise and lower support frames, side shift the support frames, and extend or retract the lateral arms and their trailer supports, all for the purposes of positioning the support frames and trailer supports in relation to trailers to be lifted and stacked on top of other trailers. Therefore, the embodiments illustrated in the drawings and discussed above should not be understood as strictly limiting since many of the components providing means for movement could be substituted with similar components providing similar mechanical functionality without departing from the scope of the invention hereby disclosed.

Likewise, the air cylinders 81, 82, 91, 92 discussed above could be replaced by mechanical springs, hydraulic cylinders, or other similar devices so long as the means allows for the trailer supports 35, 45 to float forward in response to an abrupt horizontal force or instantaneous forward movement of a trailer that is in contact with the trailer supports 35, 35. The main functionality of the air cylinders 81, 82, 91, 92 is to provide the ability of the trailer supports 35, 45 to float forward with the trailer if it lurches forward when being set down. Using springs, hydraulic pistons, or hydraulic actuators would work in much the same manner as the air cylinders.

As can be understood from a review of the drawings and the above detailed description, the trailer stacking device 100 and its four masts 30, 40 may be used to lift and position trailers so that they may be stacked one on top of the other. The stacked trailers are typically lashed, tied, or chained together for subsequent storage or transport.

Additional variations and alternative embodiments of the trailer stacking device that are not illustrated in the drawing figures but which can be understood from the figures and the above description involve use of either two or three primary masts rather than the four primary masts that have been illustrated and described above for the preferred embodiments. It would be possible to use a combination of only two of the masts that could be located on the same side of a trailer that is to be stacked. In such embodiments, the masts, support frames, lateral arms, trailer supports, and all of the actuators would have the same basic structure as the masts 30, 40 and their components that have been described above. Two moveable masts 30, two stationary masts 40, or a combination of a moveable mast 30 and a stationary mast 40 could be used in such an embodiment that has only two primary masts. Alternatively, an embodiment incorporating three masts where one mast is located on either side of a trailer and a third mast is moveable to a position either at the back or on one side near the back of the trailer would also be within the scope of the invention hereby disclosed. In all such alternative embodiments, mast tracks could be located on one or both sides of the location where the trailer would be located during stacking operations, or the mast tracks could be located near the location where the rear of the trailer would be located during stacking operations.

An additional aspect of the disclosed trailer stacking device that may not be immediately ascertainable from the figures alone is that the individuals masts 30, 40 and their corresponding individual support frames 60, 70 may be independently operated during, prior to, and after trailer stacking operations. While lifting of trailers using two or more masts 30, 40 will normally involve raising the respective support frames 60, 70 in unison with each other, it is also possible to separately and independently raise or lower the support frames 60, 70 using the individual vertical actuators 39, 49. Likewise, it is possible to use a horizontal actuator 37, 47 to independently side-shift/horizontally move one of the support frames 60, 70 without simultaneously horizontally moving all of them. Further, while the moveable masts 30 have generally been illustrated as being approximately laterally aligned with each other or across from each other with respect to the guardrails 10, to the extent an embodiment of the device is comprised of more than one moveable mast 30, it is not required that they be laterally aligned with each other in order to accomplish trailer lifting, and in fact it may sometimes be necessary to have moveable masts 30 positioned at locations where they are not directly across from each other while being used to lift a trailer. The main point being that however many masts 30, 40 and whatever combination of types of masts are used in an embodiment, the masts and their components are independently operable, though they will frequently be operated in concert with each other for lifting and stacking operations.

The embodiments and other features, aspects, and advantages of the present invention may be best understood and appreciated with reference to the drawings, descriptions, and claims. Where used in the various figures of the drawings, the same numerals designate the same or similar parts. Furthermore, when the terms "along", "atop", "top", "bottom", "forward", "backward", "front", "back", "first", "second", "third", "end", "ends", "side", "sides", "edge", "edges", "horizontal", "lateral", "length", "vertical", "perpendicular", "parallel", and similar terms are used herein, it should be understood that, unless otherwise specifically stated or otherwise made specifically clear by context, these terms have reference only to the structure shown in the drawings as it would appear to a person viewing the drawings, and such terms are utilized in order to facilitate describing the invention and in order to facilitate a better understanding of the invention.

Although the invention has been described with reference to specific embodiments, this description is not meant to be construed in a limiting sense. Various modifications of the disclosed embodiments, as well as alternative embodiments of the invention, will be apparent to persons skilled in the art upon reference to the description of the invention that is provided in this specification. It is, therefore, contemplated that the appended claims will cover such modifications and variations that fall within the scope of the invention.

What we claim is:

1. A trailer stacking device for lifting and stacking trailers comprised of:

two masts;

two support frames;

two trailer supports;

wherein one of the masts is rigidly affixed to the ground;

wherein the other mast is not rigidly affixed to the ground;

wherein each of the support frames is moveably attached to a respective mast;

wherein each of the trailer supports is attached to a respective support frame;

wherein each of the support frames may be selectively vertically raised or vertically lowered in relation to the mast to which the support frame is moveably attached.

2. The trailer stacking device of claim 1 further comprising:

guide rails rigidly affixed to the ground;

wherein the guide rails are used for positioning trailers to be stacked.

3. The trailer stacking device of claim 1 wherein the mast that is not rigidly affixed to the ground is a moveable mast that includes means for movement to a desired location such that the moveable mast may be positioned at a desired distance apart from the mast that is rigidly affixed to the ground in order to accommodate various lengths of trailers to be stacked.

4. The trailer stacking device of claim 3 further comprising:

mast tracks that are rigidly affixed to the ground, wherein the at least one moveable mast is moveably connected to the mast tracks and may be moved to a desired location along the length of the mast tracks.

5. The trailer stacking device of claim 4 further comprising:

guide rails rigidly affixed to the ground, wherein the guide rails are used for positioning trailers to be stacked in relation to the location of one or more masts.

6. The trailer stacking device of claim 1 further comprising:

first actuation means for moving the support frame of each mast in a vertical direction in relation to the mast to which the support frame is moveably attached such that the first actuation means allows for the support frame to be vertically raised or vertically lowered to a desired location;

second actuation means for moving the support frame of each mast in a first horizontal direction that is orthogonal to the vertical direction such that the support frames may be selectively horizontally shifted in relation to its respective mast by such second actuation means;

third actuation means for moving the trailer support attached to each support frame in a second horizontal direction that is orthogonal to the first horizontal direction such that the trailer supports may be selectively extended away from their respective support frames or retracted towards their respective support frames by such third actuation means.

7. The trailer stacking device of claim 6 further comprising:

means for floating movement of the trailer supports in response to sudden forward movement of a trailer that is in contact with the trailer supports.

8. A trailer stacking device for lifting and stacking trailers comprised of:

four masts;

wherein two of the masts are rigidly affixed to the ground;

wherein the other two masts are not rigidly affixed to the ground;

four support frames;

four trailer supports;

wherein each of the support frames is moveably attached to a respective mast;

wherein each of the trailer supports is moveably attached to a respective support frame;

wherein each of the support frames may be selectively vertically raised or vertically lowered in relation to the mast to which the support frame is moveably attached.

9. The trailer stacking device of claim 8 further comprising:

guide rails rigidly affixed to the ground;

wherein the guide rails are used for positioning trailers to be stacked.

10. The trailer stacking device of claim 8 wherein the two masts that are rigidly affixed to the ground are stationary masts that cannot be moved during operation of the trailer stacking device, and the two masts not rigidly affixed to the ground are moveable masts that include means for movement to a desired location such that the moveable masts may be positioned at a desired distance apart from the stationary masts that are rigidly affixed to the ground in order to accommodate various lengths of trailers to be stacked.

11. The trailer stacking device of claim 10 further comprising:

two sets of mast tracks that are rigidly affixed to the ground, wherein the moveable masts are each moveably connected to one of the sets of mast tracks and may be moved to desired locations along the length of their respective mast tracks.

12. The trailer stacking device of claim 11 further comprising:

guide rails rigidly affixed to the ground, wherein the guide rails are used for positioning trailers to be stacked in relation to the location of the masts.

13. The trailer stacking device of claim 8 further comprising:

first actuation means for moving the support frame of each mast in a vertical direction in relation to the mast to which the support frame is moveably attached such that the first actuation means allows for the support frame to be vertically raised or vertically lowered to a desired location;

second actuation means for moving the support frame of each mast in a first horizontal direction that is orthogonal to the vertical direction such that each support frames may be selectively horizontally shifted in relation to the respective mast to which the support frame is moveably attached by such second actuation means;

third actuation means for moving the trailer support attached to each support frame in a second horizontal direction that is orthogonal to the first horizontal direction such that the trailer supports may be selectively extended away from their respective support frames or retracted towards their respective support frames by such third actuation means.

14. The trailer stacking device of claim 13 further comprising:

means for floating movement of the trailer supports in response to sudden forward movement of a trailer that is in contact with the trailer supports.

* * * * *